Dec. 2, 1924.
M. R. SHEEN
1,517,803
BLOCK FORMING MACHINE
Filed Aug. 8, 1922     3 Sheets-Sheet 1
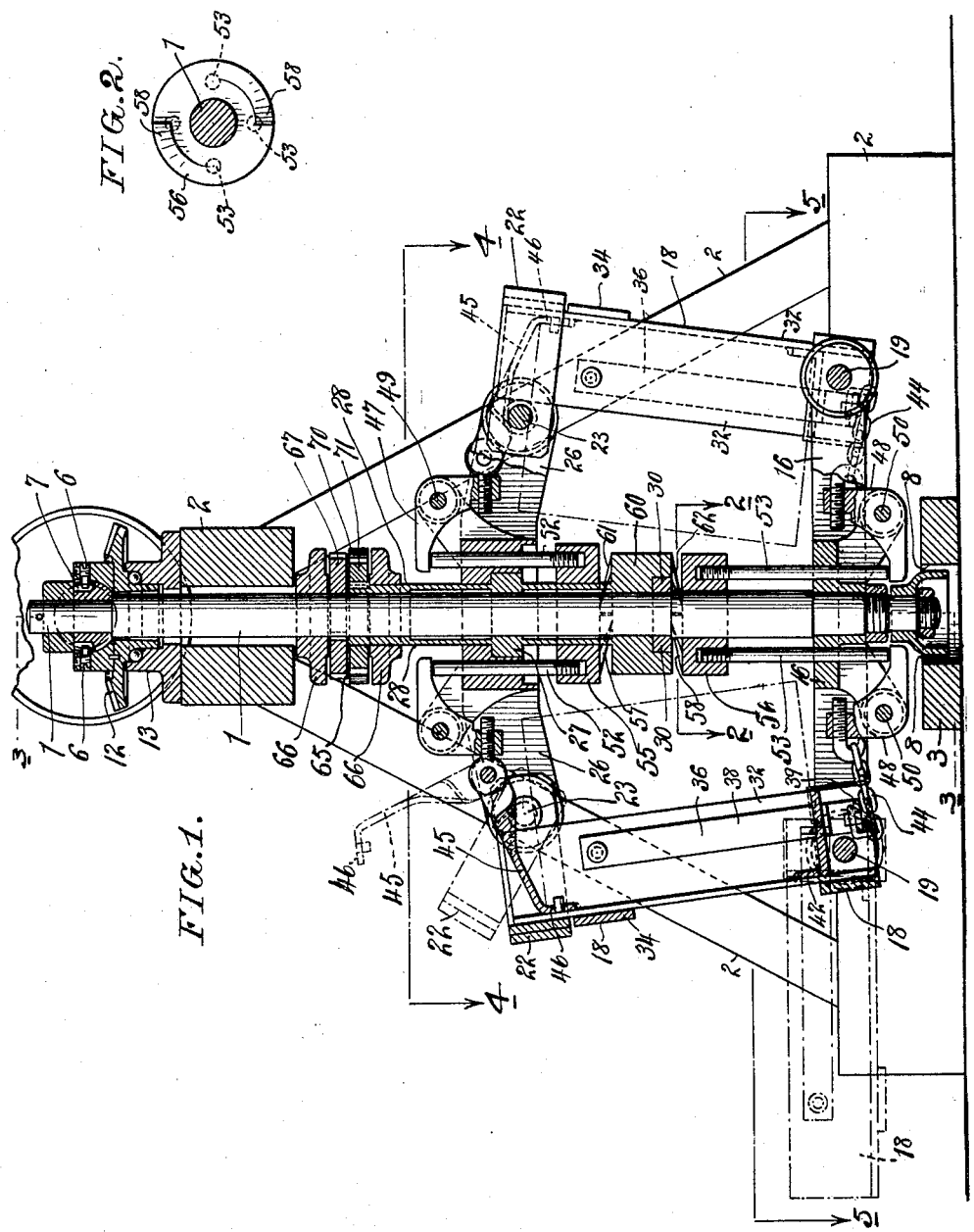
Inventor:
Milton R. Sheen
By F. DeWitt Goodwin Attorney Dec. 2, 1924.

M. R. SHEEN 1,517,803

BLOCK FORMING MACHINE

Filed Aug. 8, 1922    3 Sheets-Sheet 2

Inventor:
Milton R. Sheen
By F. DeWitt Goodwin
Attorney

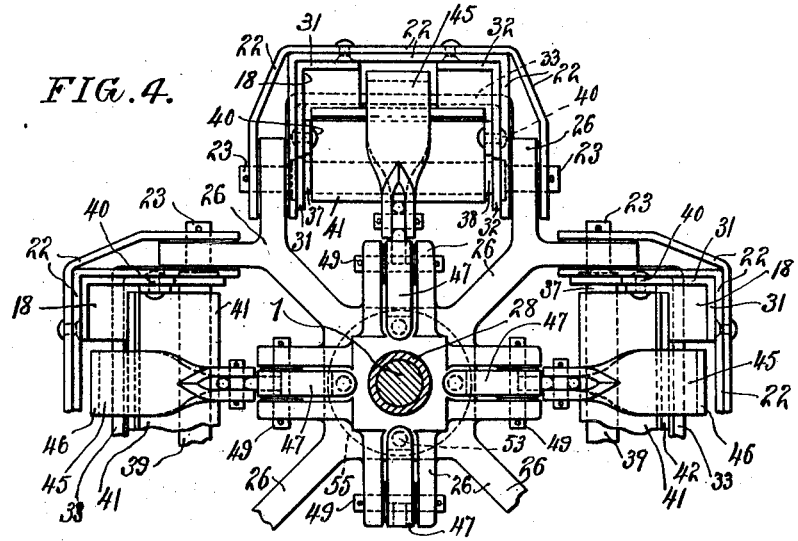
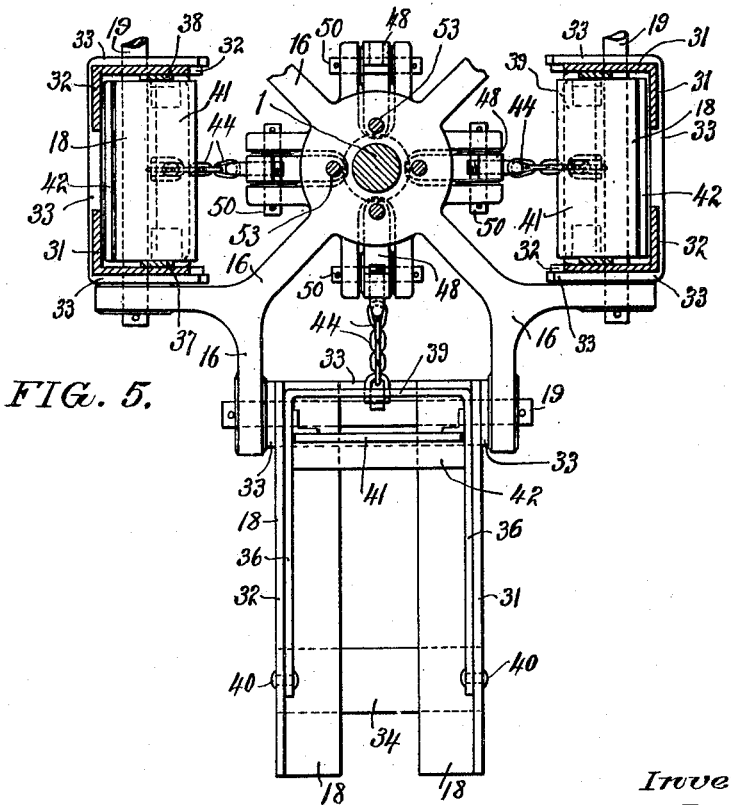

Patented Dec. 2, 1924.

1,517,803

UNITED STATES PATENT OFFICE.

MILTON ROY SHEEN, OF PHILADELPHIA, PENNSYLVANIA, ASSIGNOR TO TUNNEL MACHINE MANUFACTURING AND ENGINEERING COMPANY, OF PHILADELPHIA, PENNSYLVANIA, A CORPORATION OF DELAWARE.

BLOCK-FORMING MACHINE.

Application filed August 8, 1922. Serial No. 580,395.

*To all whom it may concern:*

Be it known that I, MILTON ROY SHEEN, a citizen of the United States, residing at Philadelphia, in the county of Philadelphia and State of Pennsylvania, have invented certain new and useful Improvements in a Block-Forming Machine, of which the following is a specification.

My invention relates to improvements in a machine for forming blocks of plastic material, such as cement, concrete and the like.

The object of my invention is to provide a machine for rotating the molds at a high speed and simultaneously jarring the molds containing the material to be treated, thereby producing a block of greater density than has heretofore been obtained.

Block forming machines have been previously constructed having means for jarring the molds during the filling of the molds with the plastic material and slowly rotating the molds during the filling of the same. Said machines, however, could not be rotated at a high speed and the molds simultaneously jarred, as the rapid rotation of the machine would prevent the functioning of the jarring mechanism.

A further object of my invention is to construct a machine having a revolving frame, for carrying the molds, embodying mechanism for slowly moving the molds towards the axis of rotation of the rotating frame, against the action of centrifugal force, and suddenly releasing the molds so that they will strike against stop members upon the frame with sufficient force to jar the contents of the molds during the rotation of the frame carrying the molds; a still further object of my invention is to provide driving mechanism embodying means for actuating the jarring operating mechanism at a relatively slower speed than the speed of rotation of the frame carrying the molds; a still further object of my invention is to rotate the frame upon a vertical axis and to position the molds at an oblique angle upon the frame, so that the upper portion of the molds will rotate in a circle having a greater radius than the lower portion of the mold, whereby the force of gravity will be overcome by centrifugal force, thus producing a block having its inner face parallel with its outer face, and the outer portion of the block of uniform density, and a still further object of my invention is to provide novel means of construction and operation of the machine and provide means for reducing the vibration of the revolving parts and for readily inserting and removing the molds from the machine, which will be more fully hereinafter described and claimed.

Referring to the accompanying drawings;

Fig. 1 is a central vertical section of my improved block forming machine;

Fig. 2 is a horizontal section on line 2—2, Fig. 1.

Fig. 4 is a partial horizontal section on line 4—4, Fig. 1.

Fig. 5 is a partial horizontal section on line 5—5, Fig. 1, showing one of the mold carriers in the open or horizontal position ready to receive a mold.

Figure 3:
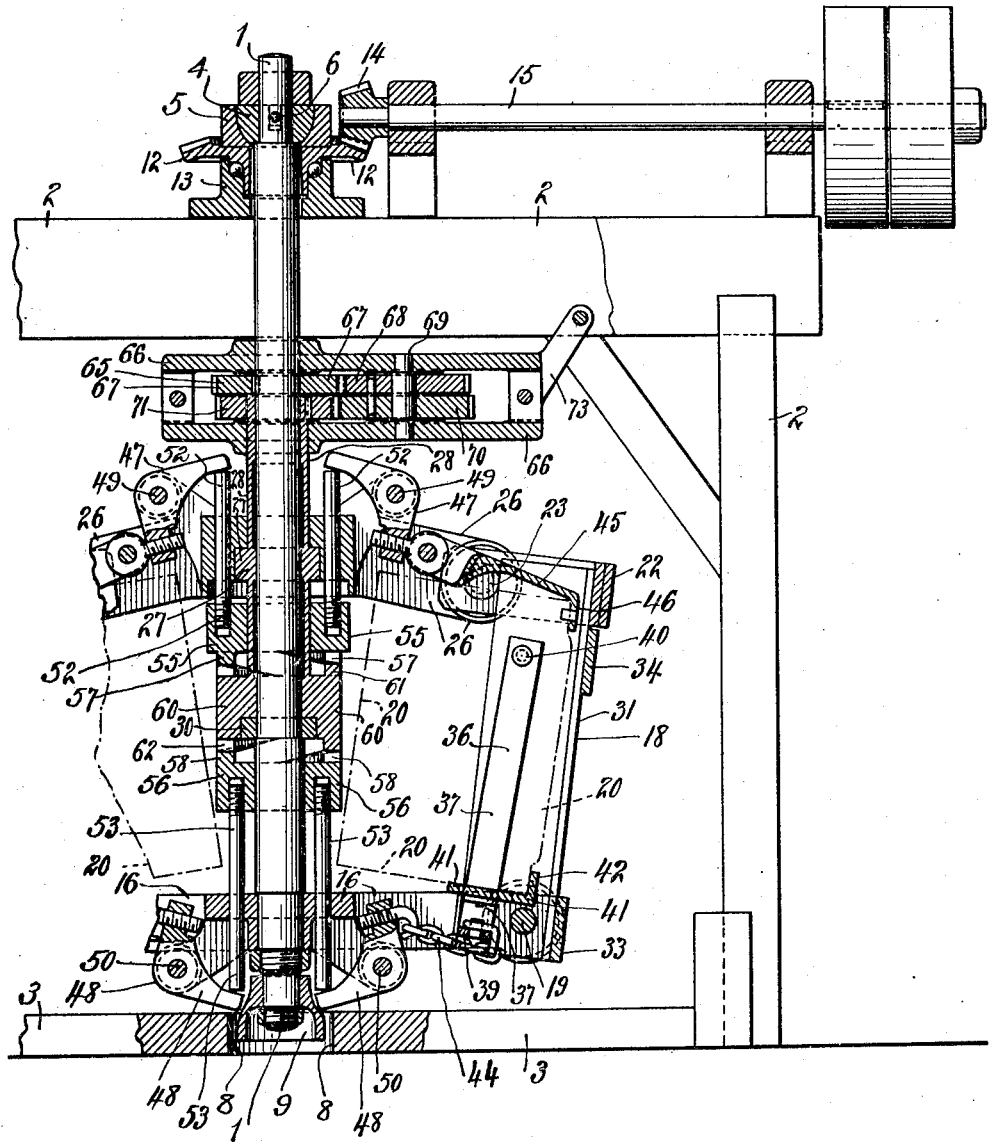
Fig. 3 is a partial vertical section on line 3—3, Fig. 1, showing the jarring mechanism in a different position.

In the accompanying drawings, in which like reference characters refer to like parts, 1 represents a central vertical shaft mounted upon a supporting structure 2. Said shaft 1 has secured thereon a spherical head 4 which rests on a block 5 having a spherical recess in which the head 4 is free to turn sufficiently to permit the lower end of the shaft 1 to swing freely within the cylindrical recess 8, formed in the base member or cross-piece 3 of the supporting structure.

The lower end of the shaft 1 has rotatably mounted thereon a wheel 9, having an enlarged cylindrical flange which is adapted to roll against the walls of the recess 8, which is larger in diameter than the diameter of the flange of the wheel 9, thus permitting a free oscillating movement of the shaft 1, within the limits of the recess 8.

The block 5, which supports the shaft 1, is provided with pins 6 which enter recesses 7 formed in the head 4, and impart a rotary motion to the shaft 1, through the beveled-gear wheel 12, upon which the block 5 is secured. Said gear wheel 12 is supported upon the bearing 13 secured upon the top cross-piece 2 of the supporting structure. The gear wheel 12 is driven through a beveled gear wheel 14 secured upon the driven shaft 15. By suspending the shaft 1 from a universal joint and allowing the lower end of the shaft to have a free movement, the machine and the supporting structure are relieved of nearly all vibration during rotation of the revolving frame carried by the shaft 1.

Secured to the lower end of the shaft 1 is the lower frame section 16, upon which are mounted the mold carriers. The frame 16 is constructed to carry four mold carriers or cradles 18.

Each mold carrier or cradle 18 is pivoted upon a shaft 19, carried by the lower frame section 16, on which shaft 19 the cradle 18 may be turned to a horizontal position, as shown in dotted lines, Fig. 1, and in full lines at the lower portion of Fig. 5, for the purpose of inserting or removing the mold 20. The cradle 18 may be turned upon the shaft 19 to an erect position, as shown in full lines, Fig. 1, in which position it is held by a bail 22 pivoted upon bolts 23 on the upper frame section 26.

The upper frame section 26 is rotatably mounted and supported upon a collar 27, on the sleeve 28 which in turn is rotatably mounted upon the central shaft 1, having a collar 30 secured thereon upon which the sleeve 28 is supported.

The cradles 18 each consist of two angle plates 31 and 32 rigidly secured together at their lower ends by a U-shaped member 33 pivoted upon the shaft 19. The upper ends of the angle plates 31 and 32 are rigidly secured together by a cross-piece 34. The bails 22, pivoted on the bolts 23, of the upper frame 26, are adapted to be turned over the upper ends of the angle plates 31 and 32, as shown in full lines Figs. 1 and 4, so as to embrace said angle plates and thus hold the mold cradle 18 in the erect position. Said bails 22 may be raised to the position shown in dotted lines Fig. 1, when it is desired to release the upper portion of the cradle 18 and turn it down into the position shown in dotted lines, Fig. 1.

The lower frame section 16 is secured upon the central shaft 1 and is rotated by the latter. The upper frame section 26 turns free upon the central shaft and the sleeve 28. When the cradles 18 are locked by the bails 22, in the elevated position, as shown in Fig. 1, the lower frame 16 will rotate the upper frame 26, thus forming a frame unit for carrying the molds 20, which may be rotated at a high speed.

The upper and lower frame sections 26 and 16 are made so that the molds 20 will stand at an oblique angle in relation to the axis of rotation of the frame. The upper part of the mold is thus positioned further from the axis of rotation than the lower portion of the mold. The angle of inclination of the mold cradles is determined by the speed at which the frame is to be rotated. As the mold is rotated, the moisture is forced out of the plastic material, leaving a space within the mold which will not be entirely filled with the material. By positioning the cradle 18 at an oblique angle, the centrifugal force causes the material in the mold to be moved, against the force of gravity, to the extent that the inner face of the block will be formed parallel with the outer face of the block, when the material sets or hardens. If the mold were rotated while in a position parallel with the axis of rotation, the force of gravity would cause the material to fill the lower end of the mold and leave a space at the upper inner corner of the mold and the finished block would not be rectangular.

The cradle 18 is provided with a swing 36, consisting of side bars 37 and 38 connected by a cross-bar 39 and pivoted at their upper ends by bolts 40 to the side plates 31 and 32 of the cradle. The bars 37 and 38 forming the swing 36 have an angle plate secured thereto which forms a seat 41 on which the mold 20 rests and upon which the mold may swing on the pivot bolts 40, when in the erect positions, shown in full lines in Figs. 1 and 3. The upwardly turned edge 42 on the seat 41 is provided for drawing the mold with the seat when the swing is moved towards the shaft 1.

The jarring mechanism for drawing the mold towards the axis of rotation of the frame, and suddenly releasing the mold to allow it to strike against the cradle, consists of a flexible member or chain 44 attached to the bottom cross-bar 39 of the swing 36 carrying the mold, and an arm 45 provided with a hook 46, for engaging the top of the mold, and mechanism for operating said parts. Said mechanism consists of bell crank levers 47 and 48 pivoted upon pins 49 and 50 upon the upper and lower frame sections 26 and 16, respectively. The bell-crank levers 47 and 48 are operated by rods 52 and 53, slidably mounted in the frames 26 and 16. The rods 52 are secured in a collar 55, slidably mounted upon the sleeve 28, and the rods 53 are secured in a collar 56, slidably mounted upon the central shaft 1. Mounted upon the shaft 1 is a cam head 60 which is secured upon the lower end of the sleeve 28 and positioned between the two cam collars 55 and 56.

The cam head 60 is provided upon its upper and lower faces with cams or teeth 61 and 62. The teeth 61 engage cams or teeth 57 upon the under side of the collar 55. The teeth 62 upon the under face of the cam head 60 engage teeth 58 upon the collar 56.

The cams or teeth upon the collars 55 and 56 and upon the cam head 60 are arranged in pairs, as shown in Fig. 2, and the teeth of each pair are arranged diametrically opposite to each other. The collars 55 and 56 will receive two movements, or strokes, upon every revolution of the cam head 60 in relation to the collars 55 and 56.

The cam head 60 is rotated at a different speed from the cam collars 55 and 56. This difference in speed will cause the inclined surfaces of the teeth or cams on the adjacent parts to engage and thus force the cam collars away from the cam head. The rods 52 and 53 secured to said cam collars will move the bell-crank levers 47 and 48 into the position shown in Fig. 3, in which the lower bell-crank lever 48 has moved the swing 36, and the lower end of the mold 20, towards the central shaft 1, and the upper bell-crank lever 47 has drawn the top of the mold towards the central shaft 1, thus leaving a space between the mold and the outer walls of the cradle 18. When the teeth of the cam head 60 pass the teeth on the cam collars 55 and 56 due to the difference in the speed of rotation, the abrupt end surfaces of the teeth will allow said cam collars to move quickly towards the cam head 60 and the centrifugal force, of the rapidly rotating molds 20, will force the molds outwardly causing them to strike against the outer walls of the cradle 18, thus causing a sudden jarring of the molds and their contents.

By changing the relative radial position of one of the cam collars 55 or 56 in relation to the cam head 60, the jarring action upon the mold may be made to act first upon one end of the mold and then upon the other end of the mold, instead of drawing both ends of the mold simultaneously towards the axis of rotation of the machine. This timing of the jarring action may be readily changed by first releasing all the cradles 18 from the upper frame section 26 allowing the cradles to assume a horizontal position; then turning the upper frame section 26 one quarter of a revolution, so as to bring the teeth on the upper cam collar 55 one quarter revolution in advance of the teeth on the upper face of the cam head 60. By thus positioning the parts, the cam head 60 will first act upon the lower cam collar 56 and then act on the upper cam collar 55, causing the jarring action to be communicated to different ends of the mold successively instead of simultaneously.

The upper and lower frame sections 26 and 16 are preferably made with four mold carriers or cradles 18, any of which are adapted to be engaged by any one of the four bails 22 of the upper frame section, thus permitting the upper frame section to be rotated a fraction of a revolution in relation to the lower frame section, when it is desired to change the timing of the jarring action upon the molds.

The difference in the speed ratio between the central shaft 1 and the sleeve 28, carrying the cam head 60, is obtained by a train of gear wheels 65, enclosed in the bearing casing 66. The shaft 1 passes through the casing 66 and the gear wheel 67 is secured to the shaft 1. Meshing with the gear wheel 67 is a gear wheel 68, mounted upon a shaft 69 carried by the casing 66. A second gear wheel 70 is also mounted on said shaft 69 and is driven by the gear wheel 68. The gear wheel 70 meshes with a smaller gear wheel 71 on the sleeve 28 which extends into the casing 66 and has the last mentioned gear wheel 71 secured thereon. The different diameters of said gears cause the sleeve 28 to rotate at a higher speed than the shaft 1 and the cam head 60 on the sleeve 28 will rotate faster than the shaft 1, causing a relatively slow jarring action between the cam head 60 and cam collars 55 and 56 and a high rotary motion of the frame carrying the molds. The bearing casing 66 is mounted upon the shaft 1 and upon the sleeve 28, and is prevented from rotating by a brace 73 secured to the supporting structure 2.

The jarring action upon the molds together with the centrifugal force exerted by the rotation of the frame carrying the molds will cause the plastic material in the molds to compact to a greater density than has heretofore been obtained in the manufacture of concrete blocks and furthermore the time required for the operation of the machine for each set of molds is reduced and the blocks may be removed from the molds in a shorter time than heretofore.

Having thus described my invention, I claim:

1. A block forming machine comprising a rotatable frame, a mold adapted to be carried upon the frame for containing plastic material to be treated, mechanism for whirling the frame, mechanism operably associated with the rotatable frame for moving the mold towards the axis of rotation of the frame and for releasing the mold to the action of centrifugal force during the rotation of the frame to impart a jarring action to the mold.

2. A block forming machine comprising a rotatable frame, a mold adapted to be carried upon the frame for containing plastic material to be treated, mechanism for whirling the frame, and mechanism for engaging the mold and imparting a jarring action to the mold during the whirling of the frame without changing the normal movement of the frame.

3. A block forming machine comprising a rotatable frame, a mold adapted to be carried upon the frame for containing plastic material to be treated, mechanism for whirling the frame, and mechanism for engaging the mold and moving it in relation to and independently of the frame for imparting a jarring action upon the mold.

4. A block forming machine comprising a rotatable frame, a mold adapted to be carried upon the frame for containing plastic material to be treated, mechanism for whirling the frame, said mold movably mounted upon the frame, and mechanism for moving the mold radially towards the axis of rotation of the frame and for suddenly releasing the mold to the action of centrifugal force for imparting a jarring motion to the mold as the latter strikes the frame when so released.

5. A block forming machine comprising a rotatable frame, a mold adapted to be carried upon the frame for containing plastic material to be treated, mechanism for whirling the frame, and mechanism for imparting a slow jarring action upon the mold during the relatively faster rotary movement of the frame carrying the mold.

6. A block forming machine comprising a central shaft, driving mechanism for rotating the shaft, a frame mounted upon said shaft and rotatable therewith, a mold carried upon said frame containing material to be treated, jarring mechanism operably associated with the driving mechanism for jarring the mold during the rotation of the frame, and variable speed mechanism associated with the jarring mechanism whereby the speed of the jarring action is relatively slower than the speed of the frame.

7. A block forming machine comprising a central shaft, driving mechanism for rotating the shaft, a frame mounted upon said shaft and rotatable therewith, a mold carried by the frame containing the material to be treated, mechanism in operable relation with the central shaft for drawing the mold towards the axis of rotation of the frame and suddenly releasing the mold during the rotation of the frame, and a stop upon the frame against which the mold strikes due to the action of centrifugal force when the mold is released.

8. A block forming machine comprising a central shaft, driving mechanism for rotating the shaft, a frame mounted upon said shaft and rotatable therewith, a mold carried by the frame containing the material to be treated, a cam head rotatably mounted upon the shaft, a collar rotatable with said frame and adapted to be moved lengthwise of the shaft by the action of the cam head, and mechanism operably associated with said collar adapted to engage the mold and impart a jarring action upon the mold.

9. A block forming machine comprising a central shaft, driving mechanism for rotating the shaft, a frame mounted upon said shaft and rotatable therewith, a mold carried by the frame containing the material to be treated, a cam head rotatably mounted upon the shaft, a collar rotatable with said frame and adapted to be moved lengthwise of said shaft by the action of the cam head, a bell crank lever pivoted upon the frame, a part for actuating the bell crank lever by the movement of said collar, and a part associated with the bell-crank lever for engaging the mold and imparting a jarring action upon the mold.

10. A block forming machine comprising a central shaft, driving mechanism for rotating the shaft, a frame mounted upon said shaft and rotatable therewith, a mold carried by the frame containing the material to be treated, a cam head rotatably mounted upon the shaft, a collar slidably mounted upon the shaft and actuated by the cam head, a rod secured in said collar and slidably mounted in the frame adapted to rotate the collar with the frame, a lever pivoted upon the frame actuated by the sliding movement of said rod, and a part associated with said lever for engaging the mold and imparting a jarring action upon the mold.

11. A block forming machine comprising a central shaft, driving mechanism for rotating the shaft, a frame mounted upon said shaft and rotatable therewith, a mold carried by the frame containing the material to be treated, a cam head rotatably mounted upon the shaft, a collar slidably mounted upon the shaft and actuated by the cam head, a rod secured in said collar and slidably mounted in the frame adapted to rotate the collar with the frame, a bell crank lever pivotally mounted upon the frame adapted to be actuated by a longitudinal movement of the rod, a part associated with the bell-crank lever for engaging the mold and imparting a jarring action upon the mold, and mechanism for rotating the cam head at a different speed in relation to the frame carrying the mold.

12. A block forming machine comprising a central shaft, driving mechanism for rotating the shaft, a frame mounted upon said shaft and rotatable therewith, a mold carried by the frame containing the material to be treated, a cam head rotatably mounted upon the shaft, a collar rotatable with said frame and adapted to be moved lengthwise of said shaft, teeth formed upon the adjacent faces of the cam head and the collar, said teeth having inclined cam surfaces adapted to gradually force the collar away from the cam head when the latter rotates at a different speed from the collar, said teeth having abruptly terminating faces extending in a plane parallel with the axis of rotation which permit the collar to move towards said head, and mechanism operatively associated with said collar for engaging the mold and imparting a jarring motion to the same.

13. A block forming machine comprising a central shaft, driving mechanism for rotating the shaft, a frame mounted upon said shaft and rotatable therewith, a mold carried by the frame containing the material to be treated, a sleeve rotatably mounted upon said shaft, a cam head secured upon one end of the sleeve, a gear wheel secured upon the opposite end of said sleeve, a gear wheel secured upon said shaft, intermediate gear wheels meshing with the two first mentioned gear wheels for driving the cam head at a different speed relative to the shaft, a collar adapted to be moved lengthwise of the shaft by the action of the cam head, and mechanism associated with the collar for imparting a jarring action to the mold.

14. A block forming machine comprising a central shaft, driving mechanism for rotating the shaft, a frame mounted upon said shaft and rotatable therewith, a mold carried by the frame containing the material to be treated, a sleeve rotatably mounted upon said shaft, a cam head secured upon one end of the sleeve, a gear wheel secured upon the opposite end of said sleeve, a gear wheel secured upon said shaft, intermediate gear wheels meshing with the two first mentioned gear wheels for driving the cam head at a different speed relative to the shaft, a casing enclosing the said gear wheels, a counter shaft mounted in the casing carrying said intermediate gear wheels, a part for holding the casing from rotating with the central shaft, and mechanism actuated by the cam head for imparting a jarring action to the mold.

15. A block forming machine comprising a central shaft, driving mechanism for rotating the shaft, a frame mounted upon said shaft and rotatable therewith, a part movably mounted upon the frame adapted to movably support a mold containing material to be treated, a stop formed by said frame to limit the outward movement of said movable part with the mold thereon due to centrifugal force, and mechanism for moving the said movable part with the mold thereon towards the axis of rotation of the frame and for suddenly releasing the said movable part allowing it to strike against the frame and impart a jarring action upon the mold.

16. A block forming machine comprising a central shaft, driving mechanism for rotating the shaft, a frame mounted upon said shaft and rotatable therewith, a swing pivotally mounted upon the frame, a seat upon the swing for supporting a mold containing material to be treated, a stop formed by the frame for limiting the outward movement of the mold due to centrifugal force, and mechanism for moving the swing with the mold thereon towards the axis of rotation of the frame and for suddenly releasing the mold and allowing it to strike against the frame.

17. A block forming machine comprising a central shaft, driving mechanism for rotating the shaft, a frame mounted upon said shaft and rotatable therewith, a swing pivotally mounted upon the frame, a seat upon the swing for supporting a mold containing material to be treated, a stop formed by the frame for limiting the outward movement of the mold due to centrifugal force, a cam head rotatably mounted upon the central shaft, a collar slidably mounted upon said shaft and actuated by the cam head, a bell crank lever pivotally mounted upon the frame, a part operatively associating the bell-crank lever with the sliding collar, and a connecting member between the bell crank lever and the swing whereby a movement of the cam head will impart a jarring action upon the mold.

18. A block forming machine comprising a central shaft, driving mechanism for rotating the shaft, a frame mounted upon said shaft and rotatable therewith, a swing pivotally mounted upon the frame, a seat upon the swing for supporting a mold containing material to be treated, a stop formed by the frame for limiting the outward movement of the mold due to centrifugal force, mechanism associated with the revolving frame, for engaging said swing for moving the lower portion of the mold towards the axis of rotation of the frame, and mechanism for engaging the top portion of the mold for moving the same towards the axis of rotation of the frame, and means for releasing the mold to the action of centrifugal force causing the mold to strike against the frame.

19. A block forming machine comprising a central shaft, driving mechanism for rotating the shaft, a frame mounted upon said shaft and rotatable therewith, a swing pivotally mounted upon the frame, a seat upon the swing for supporting a mold containing material to be treated, a stop formed by the frame for limiting the outward movement of the mold due to centrifugal force, a cam head, a sleeve rotatably mounted upon the central shaft upon which the cam head is secured, collars mounted concentric with the central shaft and positioned at opposite sides of the cam head, said collars adapted to be moved longitudinally of the shaft by the cam head, mechanism operably associated with the lower one of said collars for moving said swing towards the axis of rotation of the frame, mechanism associated with the upper one of said collars for engaging the top portion of the mold for moving it towards the axis of rotation of the frame, and means upon the cam head for releasing the collars allowing the mold to strike against the frame.

20. A block forming machine comprising a supporting structure, a central shaft, a universal bearing for suspending the shaft upon said structure, a part secured in a fixed position adjacent to the lower end of the shaft having a cylindrical recess formed therein, and a wheel rotatably mounted upon the lower end of the shaft adapted to occupy said recess formed in said part, said wheel being smaller in diameter than said recess and adapted to roll upon the cylindrical wall of said part and limit the swinging movement of the shaft.

21. A block forming machine comprising a frame rotatable upon a vertical axis, a mold for containing plastic material, and securing means upon the frame for holding the mold in an inclined position in which the upper portion of the mold is farther from the axis of rotation of the frame than the lower portion of the mold.

22. A block forming machine comprising a frame rotatable upon a vertical axis, a cradle adapted to carry a mold containing material to be treated, securing devices upon the frame for holding the cradle in an inclined position with the top of the cradle farther from the axis of rotation than the lower portion of the cradle.

23. A block forming machine comprising a central shaft, driving mechanism for rotating said shaft, a frame for carrying molds, said frame consisting of a lower section secured to said shaft, an upper frame section mounted upon said shaft and adapted to be rotated with the lower frame section, a cradle for carrying a mold containing material to be treated, said cradle adapted to be positioned between the upper and lower frame sections and said cradle detachably secured to one of said frame sections for inserting and removing the mold.

24. A block forming machine comprising a central shaft, driving mechanism for rotating said shaft, a frame for carrying molds, said frame consisting of a lower section secured to said shaft, an upper frame section mounted upon said shaft and adapted to be rotated with the lower frame section, a cradle for carrying a mold containing material to be treated, and securing devices upon said frame sections for holding the cradle in an oblique position between said frame sections whereby the upper portion of the mold carried upon the cradle will be positioned farther from the axis of rotation of the frame than the lower portion of the mold.

25. A block forming machine comprising a central shaft, driving mechanism for rotating said shaft, a lower frame section secured to said shaft, an upper frame section mounted upon said shaft adapted to be rotated with the lower frame section, a cradle adapted to carry a mold containing material to be treated, said cradle having one end hinged to the lower frame section and adapted to be raised or lowered for inserting or removing a mold, and a bail hinged upon the upper frame section adapted to embrace the cradle and hold it engaged with the upper frame section.

26. A block forming machine comprising a central shaft, driving mechanism for rotating said shaft, a lower frame section secured to said shaft, an upper frame section mounted upon said shaft adapted to be rotated with the lower frame section, a cradle having longitudinal plates secured together, said cradle pivotally mounted at one end upon the lower frame section and adapted to be placed in a horizontal position, said cradle having an open end opposite to the pivoted end for the insertion or removal of a mold, and a locking member upon the upper frame section for engaging the cradle and holding it in an elevated position.

27. A block forming machine comprising a central shaft, driving mechanism for rotating said shaft, a frame structure for carrying molds containing material to be treated, said frame structure made in separable sections, one of said frame sections secured upon the shaft, members for detachably securing said frame sections together, an upper cam collar upon said shaft, jarring mechanism positioned upon the upper frame section actuated by the upper cam collar for engaging the top portion of the molds, a lower cam collar upon said shaft, jarring mechanism positioned upon the lower frame section actuated by the lower cam collar for engaging the lower portion of the molds, a cam head rotatable upon said shaft, said cam collars positioned at opposite faces of the cam head, said cam collars slidable upon said shaft by the action of said cam head, each of said cam collars rotatable with a section of said frame whereby the timing of the cam action upon said collars may be regulated by turning one frame section a portion of a revolution in relation to the cam head.

28. A block forming machine comprising a supporting structure, a shaft mounted in said structure, driving mechanism for rotating the shaft, a lower frame section secured to said shaft, a sleeve loosely mounted upon said shaft, an upper frame section rotatably mounted upon said sleeve, a cam head secured on said sleeve positioned between said frame sections, gearing interposed between the shaft and the sleeve for driving the sleeve at a different speed from the shaft, cradles for carrying molds, said cradles hinged to the lower frame section, bails hinged to the upper frame section for locking the cradles to the upper frame section, a swing pivoted upon each cradle for supporting the mold when the cradle is locked to the upper frame section, mechanism rotatable with the frame sections actuated by the cam head for imparting a jarring action upon the molds during the rotation of the frame sections.

29. A block forming machine comprising a supporting structure, a shaft mounted in said structure, driving mechanism for rotating the shaft, a lower frame section secured to said shaft, a sleeve loosely mounted upon said shaft, an upper frame section rotatably mounted upon said sleeve, a cam head secured on said sleeve positioned between said frame sections, gearing interposed between the shaft and the sleeve for driving the sleeve at a different speed from the shaft, cradles for carrying molds, said cradles hinged to the lower frame section, bails hinged to the upper frame section for locking the cradles to the upper frame section, a swing pivoted upon each cradle for supporting the mold upon the cradle, bell crank levers pivoted upon the lower frame section, a flexible connecting member between the bell crank levers and the swings, bell crank levers pivoted upon the upper frame section, an arm pivoted to each of said upper bell crank levers, hooks upon the outer ends of said arms adapted to engage the upper portion of the mold carried upon said swing, and mechanism rotatable with each frame section adapted to be actuated by said cam head for imparting motion to the bell-crank levers during the rotation of the frame sections.

30. A block forming machine comprising a supporting structure, a shaft mounted in said structure, driving mechanism for rotating the shaft, a lower frame section secured to said shaft, a sleeve loosely mounted upon said shaft, a collar secured upon said shaft for supporting said sleeve, an upper frame section rotatably mounted upon said sleeve, a collar secured upon said sleeve for supporting said frame structure, a cam head secured upon said sleeve and positioned between said frame sections, mechanism for rotating the cam head at a different speed from the shaft, cam collars positioned above and below the cam head and slidable longitudinally of the shaft by the cam head, rods secured in said collars and slidably mounted in the upper and lower frame sections, bell crank levers pivoted upon said frame sections, cradles for carrying molds, said cradles adapted to be carried between said frame sections, and members mounted upon the bell crank levers for engaging the molds and imparting a jarring action upon the same.

In testimony whereof I affix my signature.

MILTON ROY SHEEN.